United States Patent [19]

Stribling

[11] Patent Number: 5,716,656
[45] Date of Patent: Feb. 10, 1998

[54] COLLAGEN CONTAINING ENCAPSULATED SMOKE

[75] Inventor: Kenneth V. Stribling, St. Charles, Ill.

[73] Assignee: Devro-Teepak, Inc., Westchester, Ill.

[21] Appl. No.: 751,294

[22] Filed: Nov. 18, 1996

Related U.S. Application Data

[62] Division of Ser. No. 552,835, Nov. 3, 1995, Pat. No. 5,599,570.
[51] Int. Cl.$^6$ .............................. A23J 3/04; A23L 1/314
[52] U.S. Cl. ........................... 426/92; 426/140; 426/657
[58] Field of Search ........................... 426/105, 140, 426/277, 278, 135, 657, 315, 92

[56] References Cited

U.S. PATENT DOCUMENTS

| | | | |
|---|---|---|---|
| 3,943,262 | 3/1976 | Winkler et al. | 426/140 X |
| 4,442,868 | 4/1984 | Smith et al. | 426/135 X |
| 5,230,933 | 7/1993 | Apfeld et al. | 426/105 X |
| 5,271,948 | 12/1993 | Boni et al. | 426/278 |

*Primary Examiner*—Arthur L. Corbin
*Attorney, Agent, or Firm*—Michael L. Dunn

[57] ABSTRACT

A collagen food wrapping comprising collagen extruded into a film. The collagen contains a smoke component which is encapsulated with an encapsulating material which will release the smoke component during curing or cooking and prior to consumption thereof. The invention further includes a collagen slurry containing an encapsulated liquid smoke component and a method for manufacturing a wrapped food product by extruding the slurry onto a surface of the food product to form such a film.

3 Claims, No Drawings

COLLAGEN CONTAINING ENCAPSULATED SMOKE

This is a Divisional application of application Ser. No. 08/552,835, filed Nov. 3, 1995, now U.S. Pat. No. 5,599,570.

BACKGROUND OF THE INVENTION

This invention relates to food casings, wrappings, and slurry made primarily from collagen protein.

Smoking of food products such as meats, e.g. sausages, and cheeses is often desirable in order to impart smoke flavor and color into the food product. Unfortunately, such smoking processes have certain disadvantages. In particular, smoke houses require a large amount of pollution control in order to avoid contaminating the environment.

Consequently, liquid smokes have been developed which contain absorbed smoke components which can be incorporated onto or into meat products. This still has disadvantages in that careful control of added liquid smoke is required. Liquid smokes tend to be corrosive and, if not applied properly, cause inconsistent flavor and color. Typically, liquid smoke is applied to the surface of food products either by showering, atomizing or spraying, all being relatively inefficient, i.e., more liquid smoke is lost than is applied. A less common, but not rare, method of utilizing liquid smoke is to blend a measured amount of liquid smoke directly into food products. This method, however, tends to cause artificially harsh smoke flavors and fails to impart a typical smoke color to the surface of the food product.

Collagen sausage casings and films are made by extruding a collagen paste or slurry either in the form of a tube or sheet. The tubes or sheets are subsequently used as a mold to form the sausage by filling the tube, in the case of sausage casings, or wrapping the food product in the collagen film prior to cooking, smoking or drying. A relatively new method of producing sausage products is to simultaneously extrude the sausage mixture and the collagen slurry with the slurry essentially forming the casing on the surface of the sausage mixture. This combination is subsequently treated to cross-link the collagen fibers within the collagen slurry causing the formed casing to have adequate integrity to act as a mold. Liquid smoke is sometimes used as a cross-linking agent. It is important that the collagen not be subjected to the cross-linking agent prior to the co-extrusion process and that the cross-linking agent be added in the proper strength and quantity. Subsequent to co-extrusion and initial cross-linking, these sausages are often drenched with liquid smoke to impart flavor, color and to further cross-link the collagen skin. This drenching process has many of the same disadvantages as those encountered in the traditional methods of sausage production.

Subsequently, the co-extruded sausages are cooked by heating to internal temperatures, generally in the range of 152 to 160 degrees Fahrenheit.

In the area of collagen food wrappings, such as edible collagen sausage casings and collagen slurry, it would, therefore, be desirable to incorporate smoke flavorants and/or colorants directly into the slurry in order to avoid later smoking of contained meat product in a smoke house or by wasteful spraying or drenching with liquid smoke. As previously discussed, this has generally not been possible due to degradation effects of smoke flavorants and colorants upon collagen. In particular, direct exposure of collagen slurry to liquid smoke causes the slurry to cross-link prematurely thus inhibiting formation of the food casing by extrusion into a tube which is to later be stuffed with food product or by direct extrusion onto the surface of a food product.

BRIEF DESCRIPTION OF THE INVENTION

The invention comprises a collagen food wrapping such as a sausage casing comprising collagen extruded into a film which in a sausage casing is of essentially cylindrical shape. The collagen contains a smoke component which is encapsulated with an encapsulating material which will release the smoke component prior to being consumed. The invention further comprises a collagen slurry containing an encapsulated liquid smoke component and a method for manufacturing a wrapped food product by extruding such a slurry upon a surface of the food product to form such a film.

DETAILED DESCRIPTION OF THE INVENTION

The smoke component is preferably a smoke flavorant, colorant or both derived from liquid smoke. The component may be either liquid or solid.

The food wrapping is a film or fiber reinforced sheet which may be in any shape encompassing contained food material. The food casing may be a flat film into which food is wrapped or it may be tubular, usually having an essentially cylindrical cross section. The casing may be extruded into such a shape prior to stuffing with food product or may be a film extruded directly upon a contained food product. "Essentially cylindrical", as used herein means that the casing, when stuffed with a flowable foodstuff, has a central cross section which is round or varies from round such that the central cross section has diameters which vary in length by less than 15% from each other.

The encapsulating material is an ingestible substance which will form a solid protective shell around the smoke component but which will release the smoke component prior to ingestion. "Ingestion", as used in this context, means that the component is swallowed. The encapsulating material is usually a lipid, i.e. a water insoluble, oil soluble substance. Such lipids are intended to include oil soluble fatty acids, fatty acid esters, and waxes. The encapsulating material is solid at room temperature and liquid at 100 degrees C. so that the smoke component is protected at room temperature but will be released at elevated temperatures encountered during curing or cooking.

In manufacturing the food wrapping of the invention, the encapsulated smoke component may be blended with collagen slurry to form the slurry of the invention which can be extruded to form a sheet or an empty tube or to form a tubular film around a shaped foodstuff, e.g. as described in U.S. Pat. No. 5,271,948, incorporated herein by reference.

EXAMPLE

A quantity of collagen slurry produced by the normal manufacturing process e.g., as described in U.S. Pat. No. 5,271,948, is placed in a jacketed planetary mixer. This type of mixer has two agitators that not only rotate on their axes (rotational path) but also are mechanically arranged so that their axes also rotate about the center of the mixer (planetary path).

The agitators are flat and have a rectangular shape and sufficient thickness to mix without being distorted by the compound being mixed. Further, a rectangular hole is provided in the center of the agitating blade leaving a ribbon-like perimeter to form the finished agitator. This type of construction allows the compound being mixed to pass around and through the individual agitator blades. Also, the agitators are timed to be 90 degrees out of phase with one another axially so as to maximize mixing in both the rotational path as well as the planetary path.

After transfer of the collagen slurry to the mixer, the cooling jacket of the mixer vessel is activated with a chill water flow. Encapsulated smoke flavoring is added to the slurry and the mixing commenced. The encapsulated smoke flavoring is a natural smoke flavor that has been encapsulated in a lipid. The coating required for this invention should desirably, but not essentially, have a melt point of 140–145 degrees F. The encapsulated smoke flavoring product used in the present example is a fine powder obtained from M-Cap Technologies International of Wilmington, Del. Other companies produce this type of microencapsulated smoke flavoring, e.g., Balchem Corporation, Slate Hill, N.Y.

The temperature and flow of the chill water is controlled to maintain a slurry temperature of approximately 40 degrees F. Also, the speed of the mixing is controlled at a slow enough speed so as not to generate heat from work added and not have localized hot spots caused by shear at the edges of the agitators which could break down the encapsulating shell as well as degrade the collagen.

The actual time of mixing should be minimal yet produce a good dispersion of the encapsulated smoke flavoring. This time interval is a function of batch size, mixer size and power input. In the present example, the time was not the controlled variable. Temperature and dispersion were instead the deciding factors. The dispersion was subjectively determined by sight when the mixer was opened for a temperature check. When a uniform tan color was obtained, the mix was considered done.

The amount of smoke encapsulant used in the trial was 15% based on slurry weight. A considerably higher concentration could be used as the encapsulated smoke flavor is a very fine powder that appears to mix with the slurry. It is apparent that sufficient smoke flavoring to meet meat packers requirements can be obtained for either the co-extrusion application or the addition to meat emulsion.

The slurry containing the encapsulated smoke (loaded slurry) was stored in a refrigerator for about two weeks with no apparent degradation. Heating of the loaded slurry after mixing showed a substantial increase in smoke odor. This indicated that the lipid "shell" had melted releasing the smoky odor. The heat was applied by flowing air at 170 degrees F.

What is claimed is:

1. A slurry comprising dispersed collagen and a smoke component which is encapsulated with an encapsulating material which will release the smoke component during curing or cooking of the collagen.

2. The slurry of claim 1 wherein the smoke component is selected from liquid smoke, a smoke flavorant derived from liquid smoke or a smoke colorant derived from liquid smoke.

3. The slurry of claim 1 wherein the encapsulating material is a lipid selected from the group consisting of oil soluble fatty acids, fatty acid esters and waxes.

* * * * *